United States Patent [19]
Chiu-Wei

[11] Patent Number: 5,672,824
[45] Date of Patent: Sep. 30, 1997

[54] ASYMMETRICAL BALANCE MEANS

[76] Inventor: Chao-chang Chiu-Wei, No. 157-7, Hsipan Lane, Hsipan Village, Tienwei Hsiang, Changhua Hsien, Taiwan

[21] Appl. No.: 681,217

[22] Filed: Jul. 22, 1996

[51] Int. Cl.$^6$ .................................................. G01M 1/16
[52] U.S. Cl. ........................................ 73/468; 446/236
[58] Field of Search .............................. 446/236, 396; 364/463; 73/66, 458, 468, 469, 470, 487, 485

[56] References Cited

U.S. PATENT DOCUMENTS

| | | | |
|---|---|---|---|
| 3,043,146 | 7/1962 | Fued | 73/468 |
| 3,988,935 | 11/1976 | Rosen | 73/468 |
| 4,530,239 | 7/1985 | Scarinci | 73/487 |
| 5,163,647 | 11/1992 | Fader et al. | 446/396 |

FOREIGN PATENT DOCUMENTS

WO84/01652  4/1984  WIPO ................................. 446/396

*Primary Examiner*—Christine K. Oda

*Attorney, Agent, or Firm*—Martin Korn

[57] ABSTRACT

An asymmetrical balance device includes nine positions formed thereto, from position 1 to position 9, each of the positions being a center of gravity of a part disposed thereto, the center of gravity having a value the same as the numeral designating the position, the eight positions, except position 5, being arranged to form a square with the position 5 located at a center of the square, the square including an upper horizontal side, a lower horizontal side, a right vertical side and a left vertical side, the right vertical side respectively intersecting with the upper horizontal side and the lower horizontal side at position 2 and position 6, the left vertical side respectively intersecting with the upper horizontal side and the lower horizontal side at position 4 and position 8, the upper horizontal side and the lower horizontal side respectively having position 9 and position 1 located at a middle point thereof, the right vertical side and the left vertical side respectively having position 7 and position 3 located at a middle point thereof such that the device is maintained to be balanced corresponding to any straight axis including three positions.

4 Claims, 16 Drawing Sheets

ASYMMETRICAL BALANCE MEANS

BACKGROUND OF THE INVENTION

1. Field of the Invention

The present invention relates to a balance means and more particularly, to a balance means with an asymmetrical appearance such that the means is maintained to be balanced whenever it is rotated or put on a horizontal plane.

2. Brief Description of the Prior Art

Generally, a symmetrical outer appearance is a basic requirement to design a rotatable part, such as an arrangement of the blades of a ceiling fan, an arrangement of rotor blades of a helicopter and the like. The requirement in fact is an extremely limited condition for designers, which restricts the range or the scope of a way of thinking of the designers when considering their inventions and thus any new design is limited under the condition.

The present invention intends to provide an asymmetrical balance means which can be maintained to be balanced whenever it is in rotation or put on a horizontal plane, and the means has an asymmetrical outer appearance.

SUMMARY OF THE INVENTION

The present invention provides an asymmetrical balance means which includes nine positions formed thereto, from position 1 to position 9, each of the positions being a center of gravity of a part disposed thereto, the center of gravity having a value the same as the numeral designating the position. The eight positions, except the position 5, are arranged to form a square with the position 5 located at a center of the square. The square includes an upper horizontal side, a lower horizontal side, a right vertical side and a left vertical side. The right vertical side intersects with the upper horizontal side and the lower horizontal side respectively at position 2 and position 6, the left vertical side intersecting with the upper horizontal side and the lower horizontal side respectively at position 4 and position 8. The upper horizontal side and the lower horizontal side respectively have a position 9 and a position 1 located at a middle point thereof, the right vertical side and the left vertical side respectively having a position 7 and a position 3 located at a middle point thereof such that the means is maintained to be balanced corresponding to any straight axis including three positions having position 5 included.

It is an object of the present invention to provide a means having an asymmetrical appearance but being able to be maintained to be balanced corresponding to some specified axes of the means.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
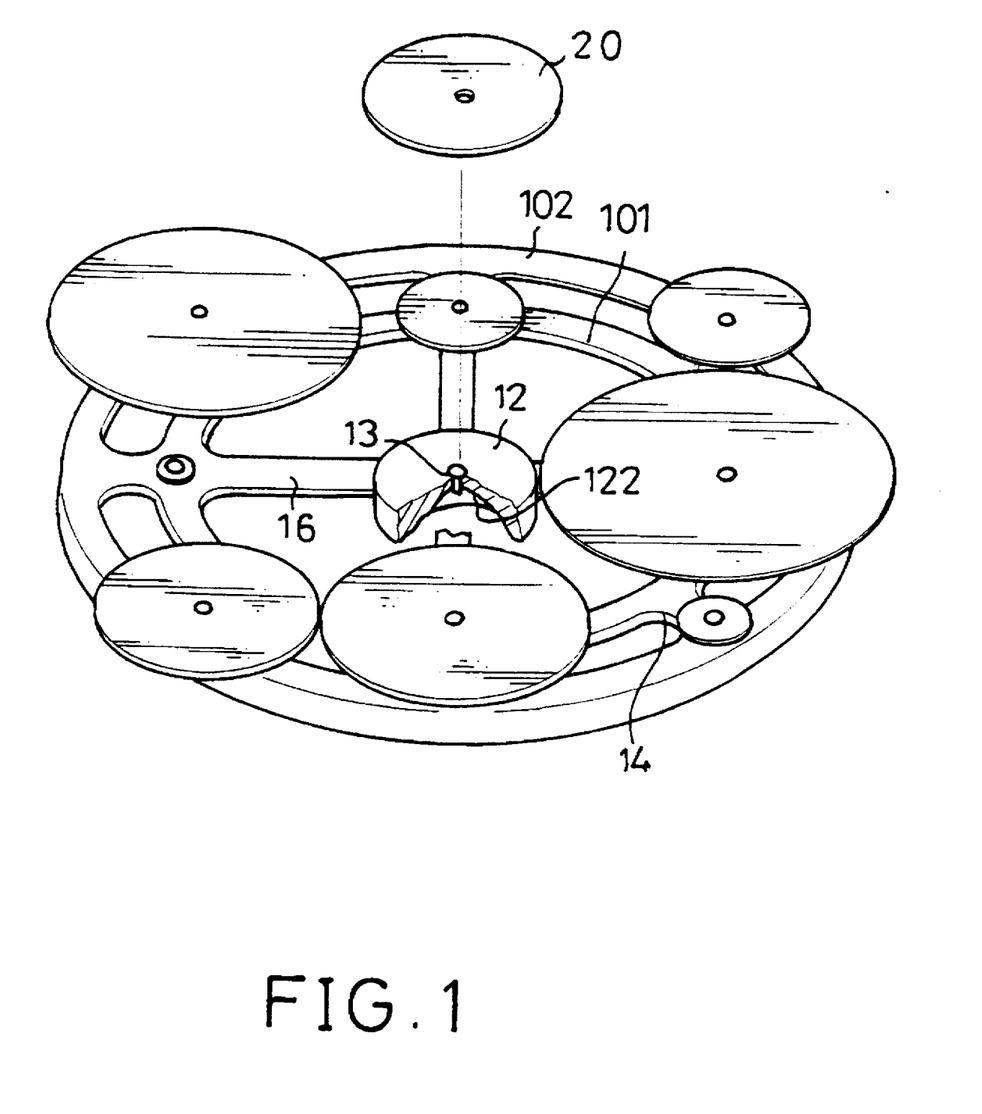
FIG. 1 is an exploded view of a first embodiment of an asymmetrical means in accordance with the present invention.
Figure 2:
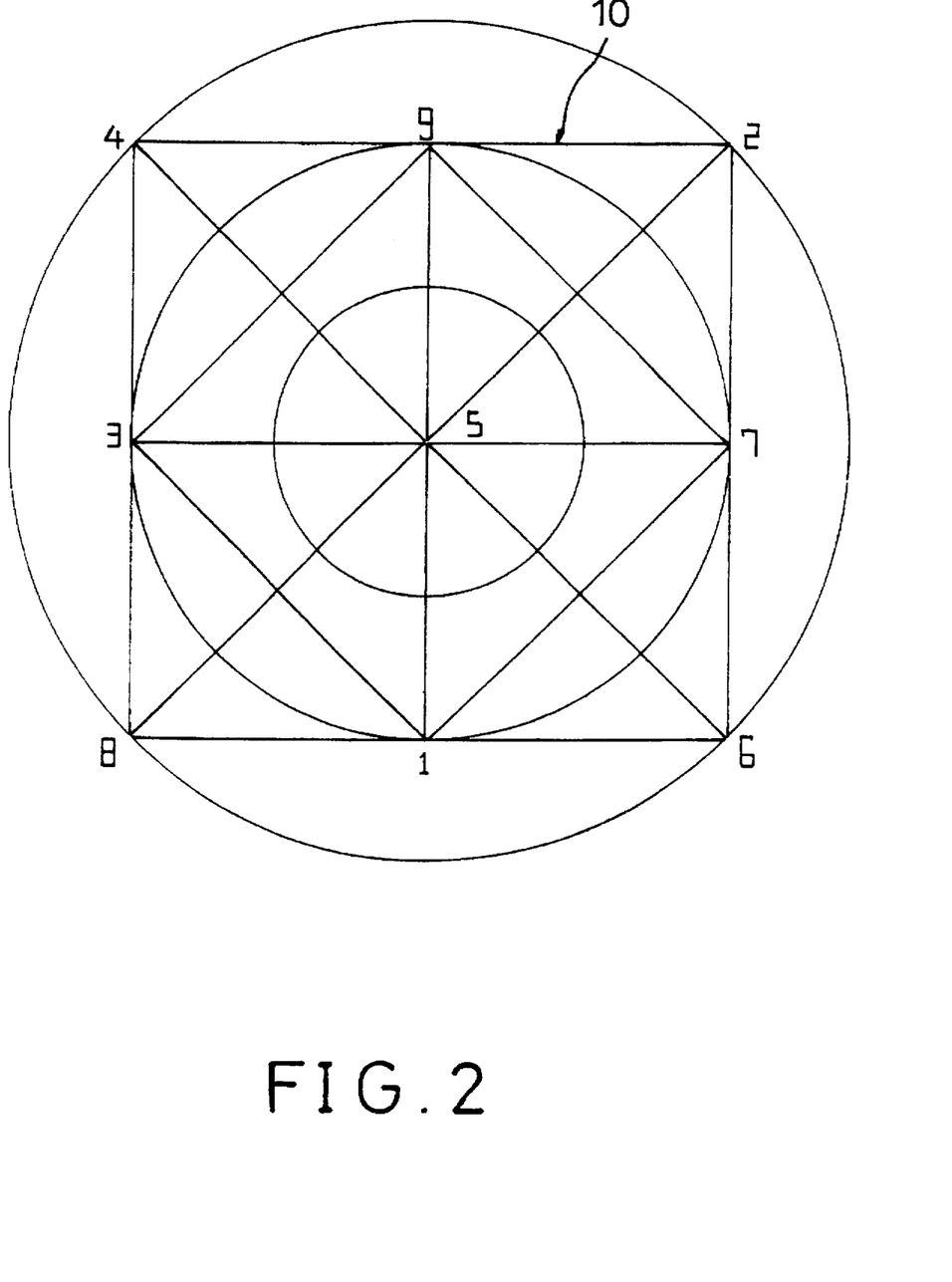
FIG. 2 is an illustrative view to show the positions arranged in a plane where the means is located.
Figure 3:
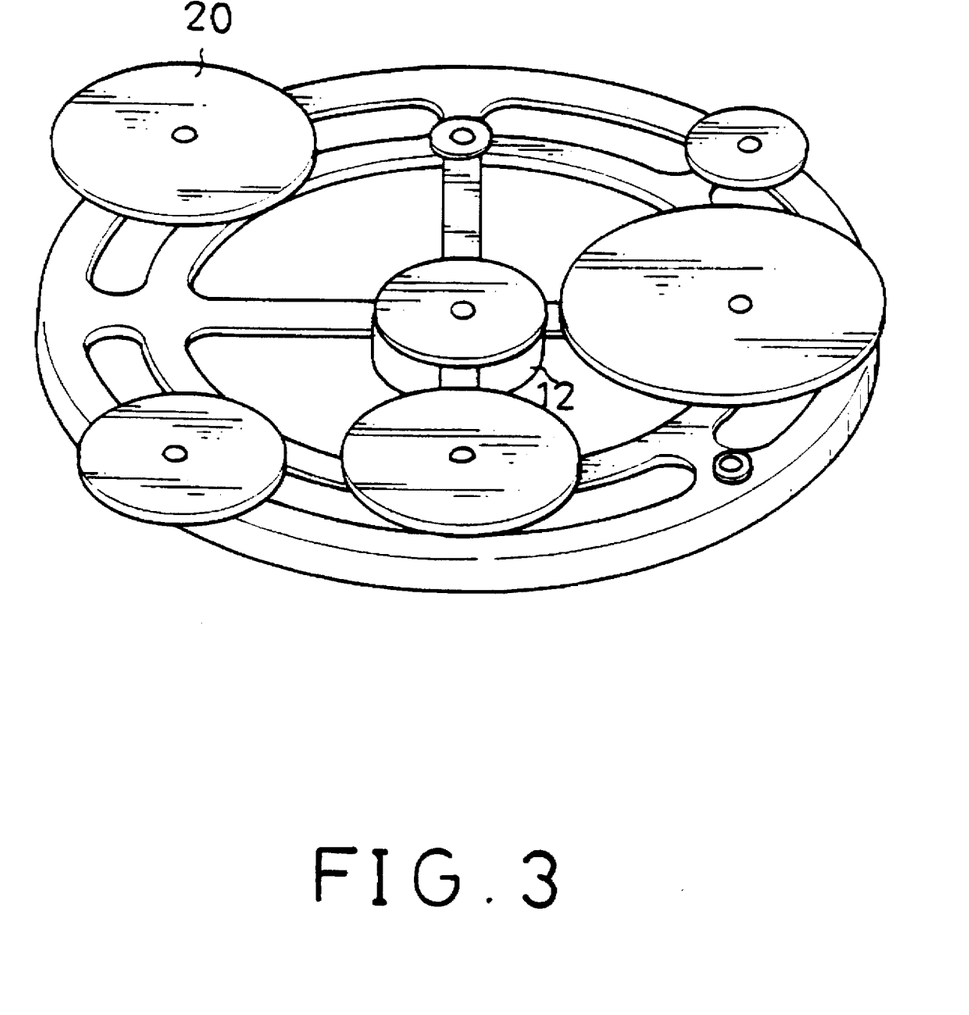
FIG. 3 is a perspective view of the means in accordance with the present invention.

Referring to the drawings and initially to FIGS. 1 through 3, especially to FIG. 2, an asymmetrical balance means in accordance with the present invention generally includes nine positions formed thereto, from position 1 to position 9 as shown in FIG. 2 and designated by numerals 1–9, each of the positions representing a center of gravity of a part disposed thereto, the center of gravity having a value the same as the numeral designating the position.

The eight positions 1, 2, 3, 4, 6, 7, 8 and 9, except the position 5, being arranged such that a square 10 is formed by connecting the eight positions with the position 5 located at a center of the square 10.

The square 10 comprises an upper horizontal side, a lower horizontal side, a right vertical side and a left vertical side. The right vertical side intersects with the upper horizontal side at position 2 and intersects with the lower horizontal side at position 6, the left vertical side intersecting with the upper horizontal side at position 4 and intersecting with the lower horizontal side at position 8. The upper horizontal side has the position 9 located at a middle point thereof and the lower horizontal side has the position 1 located at a middle point thereof. The right vertical side has the position 7 located at a middle point thereof and the left vertical side has the position 3 located at a middle point thereof.

The first embodiment of the asymmetrical balance means comprises a first loop 101 and a second loop 102, the first loop 101 inscribing to the square 10 wherein the square 10 and the first loop 101 respectively contact at the positions 7, 9, 3 and 1. A first cross frame 16 is disposed within the first loop 101 and an intersection of the first cross frame 16 is coincided with a center of the first loop 101, and the second loop 102 circumscribing to the square 10. In order to reinforce the structure of the means, right ribs 14 extend radially outwardly from an outer periphery of the first loop 101 to connect to an inner periphery of the second loop 102. A cap 12 is disposed to the position 5 by a pin 13 and the cap 12 has a recess 122 defined in a bottom thereof such that a user's finger (not shown) can be received in the recess 122 to rotate the means. Each of the positions 1, 2, 3, 4, 6, 7, 8 and 9 has a disk 20 disposed thereto and each of the disks 20 has a center of gravity located at a center thereof, the respective center of gravity having a weight the same as the numeral designating the corresponding position, for example position 9 has 9 unit weights. It is noted that, such an arrangement of the positions 1–9 provides a balance condition corresponding to some certain axes passing through the position 5 of the means, for example, for an axis of positions 2–5–8, there are three weights of 9, 4 and 3 on the left side of the axis and weights of 7, 6 and 1 on the right side of the axis. The sum of each of the weights 9, 4 and 3 multiplied by a corresponding distance perpendicular to the axis (take moment for each of the weight corresponding to the axis) is equal to the sum of each of the weights 7, 6 and 1 multiplied by a corresponding distance perpendicular to the axis. If the distance to the axis for weight 9 is 1, then the sum of each of two sides corresponding to the axis is 20. Thus when the means is rotated about the axis of positions 2–5–8, it is maintained to be balanced. Similarly, if the means is rotated about an axis passing through the position 5, such as the axes of positions 4–5–6, 9–5–1 and 3–5–7, because the positions 1, 2, 3, 4, 6, 7, 8 and 9, except position 5, are located at the four corners of the square 10 and the middle point of each of four sides of the square 10 such that when the means is rotated corresponding to an axis passing through the position 5 and being perpendicular to a plane where the first loop 101 is located, the means is also maintained to be balanced.

Figure 4:
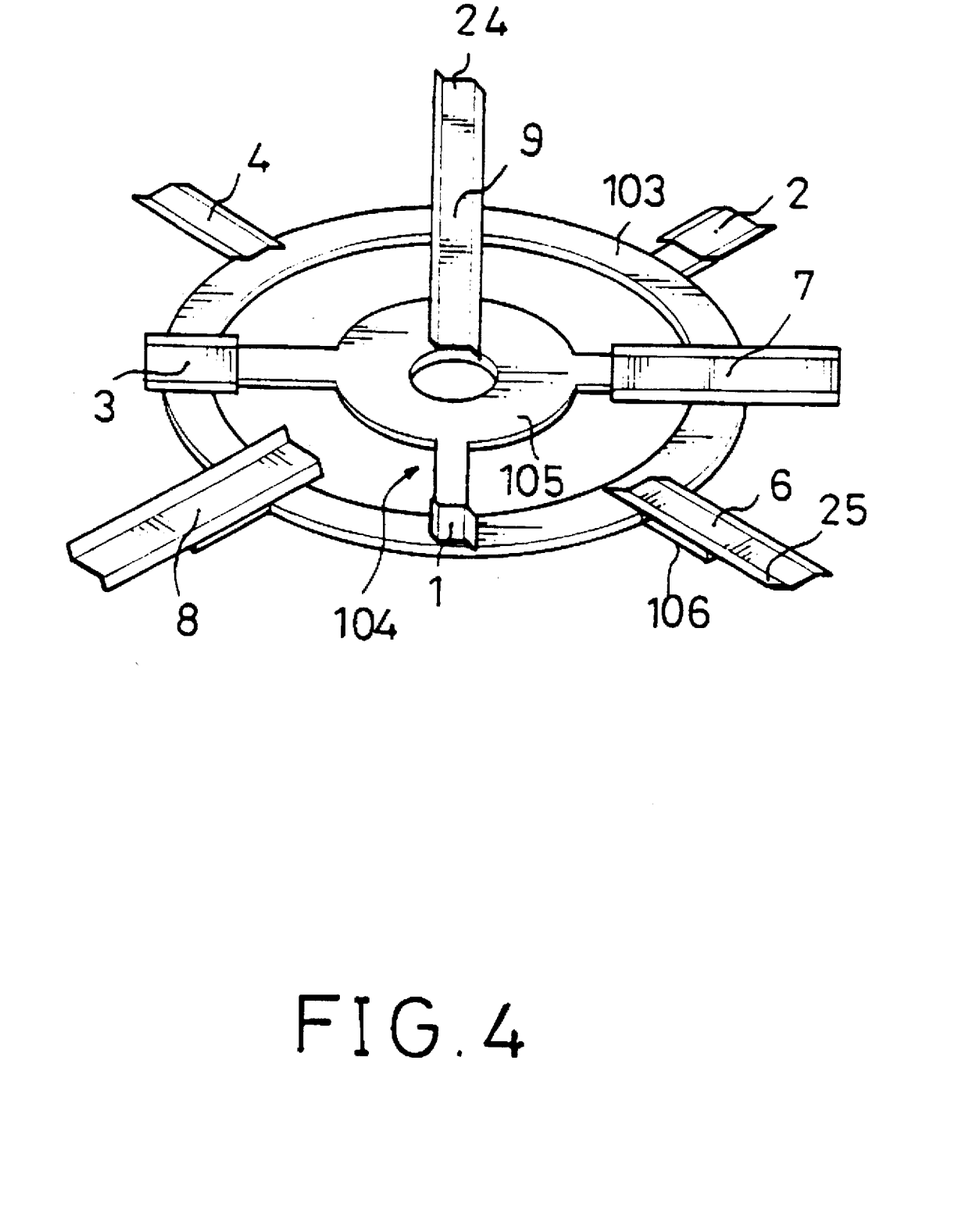
FIG. 4 is a perspective view of a second embodiment of the means in accordance with the present invention.

Referring to FIG. 4, a second embodiment of the means can be simplified to include a loop 103 in which a cross frame 104 is inter-connectedly disposed, a small loop 105 is disposed to an intersection of the cross frame 104 and the small loop 105 has a center of gravity at a center of the intersection of the cross frame 104. The cross frame 104 intersects the periphery of the loop 103 at the positions 7, 9, 3 and 1, each of the positions 7, 9, 3 and 1 having a weight 24 disposed thereto wherein each of the weights 24 has a center of gravity at the corresponding positions 9, 3, 1 and 7. A stud 106 extends radially outwardly from an outer periphery of the loop 103 and each of the studs 106 has a weight 25 disposed thereto wherein each of the weights 25 has a center of gravity at positions 2, 4, 8 and 6 corresponding thereto. All the positions 2, 9, 4, 3, 8, 1, 6 and 7 are arranged as the positions of the square shown in FIG. 2.

Figure 5:
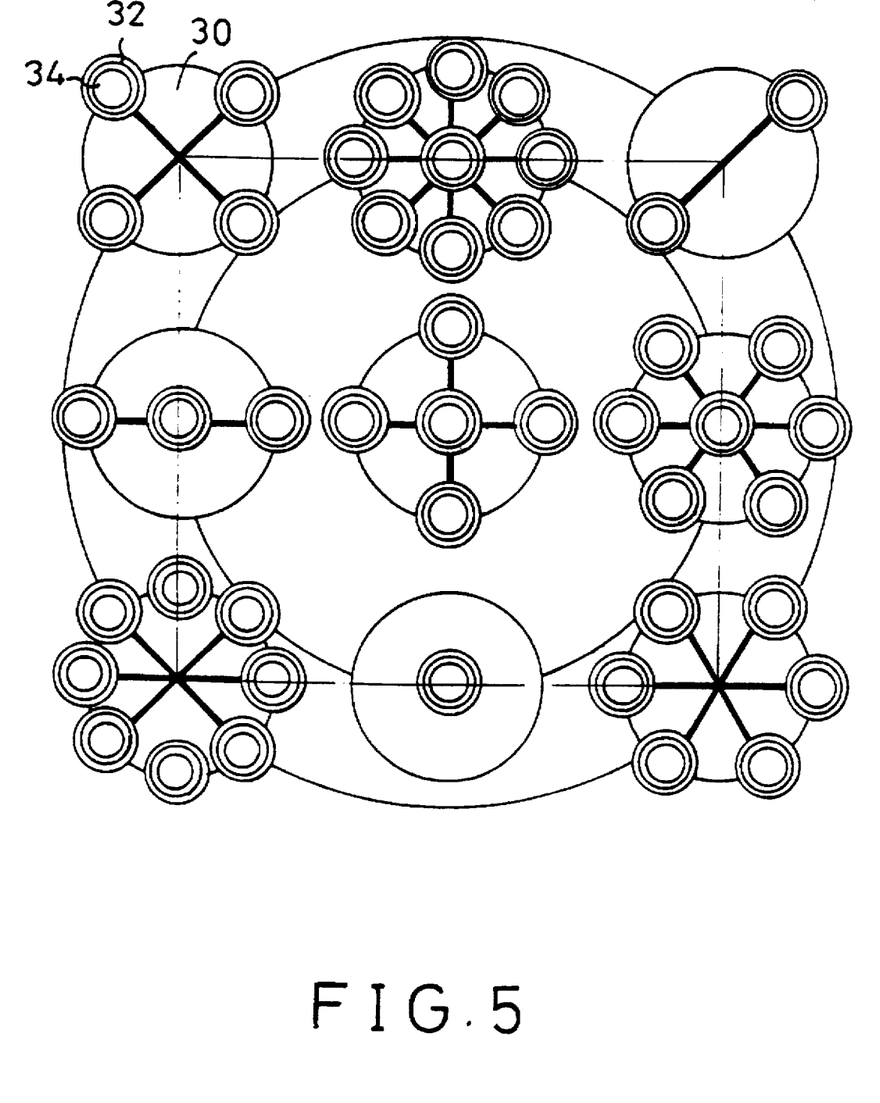
FIG. 5 is a top plan view to show a third embodiment of the means in accordance with the present invention.

FIG. 5 shows a third embodiment of the means and which is transformed from the means shown in FIG. 3, that is to say, each of the positions 1–9 is provided with a disk 30 and each of the disks 30 has a cup or cups 32 disposed thereto, the number(s) of the cup(s) 32 is the same as the numeral designating the position, such that a user (not shown) can try to put a ball 34 in the cup(s) 32 to achieve a balance of the means.

Figure 6:
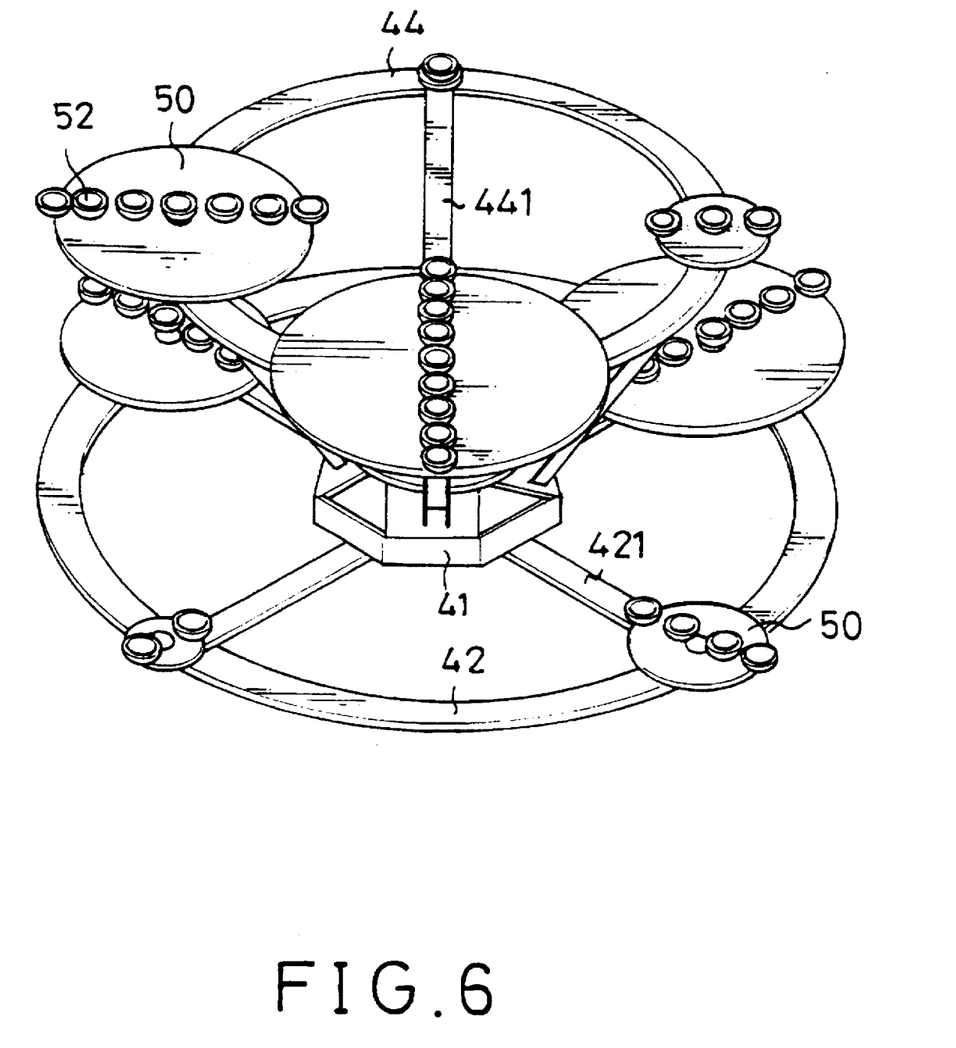
FIG. 6 is a perspective view of a fourth embodiment of the means in accordance with the present invention.

Referring to FIG. 6, a fourth embodiment of the means comprises a third loop 44 inscribing to the square 10 as shown in FIG. 2 and having four positions which are position 7, position 9, position 3 and position 1 disposed thereto. Each of the positions 7, 9, 3 and 1 has a disk 50 disposed thereto and each of the disks 50 has a cup 52 or cups 52 disposed thereto, the number(s) of the cup(s) 52 are the same as the numeral designating the position corresponding thereto. A fourth loop 42 is disposed below the third loop 44 with four links 441 connected between the third loop 44 and the fourth loop 42, a projection of the fourth loop 42 circumscribing to a square including positions 7, 9, 3 and 1 as mentioned above. A second cross frame 421 is disposed within the fourth loop 42 and an intersection of the second cross frame 421 is coincided with a center of the fourth loop 42. A central disk 41 is disposed to the intersection of the second cross frame 421 such that the four links 441 extending from the third loop 44 connect to the central disk 41. Positions 2, 4, 8 and 6 are respectively disposed to the fourth loop 42 at the positions as shown in FIG. 2. Similarly, each of the positions 2, 4, 8 and 6 has a disk 50 disposed thereto and each of the disks 50 and the central disk 41 has cups 52 disposed thereto wherein the numbers of the cups 52 are the same as the numeral designating the position such that the user can put a ball or balls (not shown) in the cup(s) 52 as described relative to FIG. 5.

Figure 7:
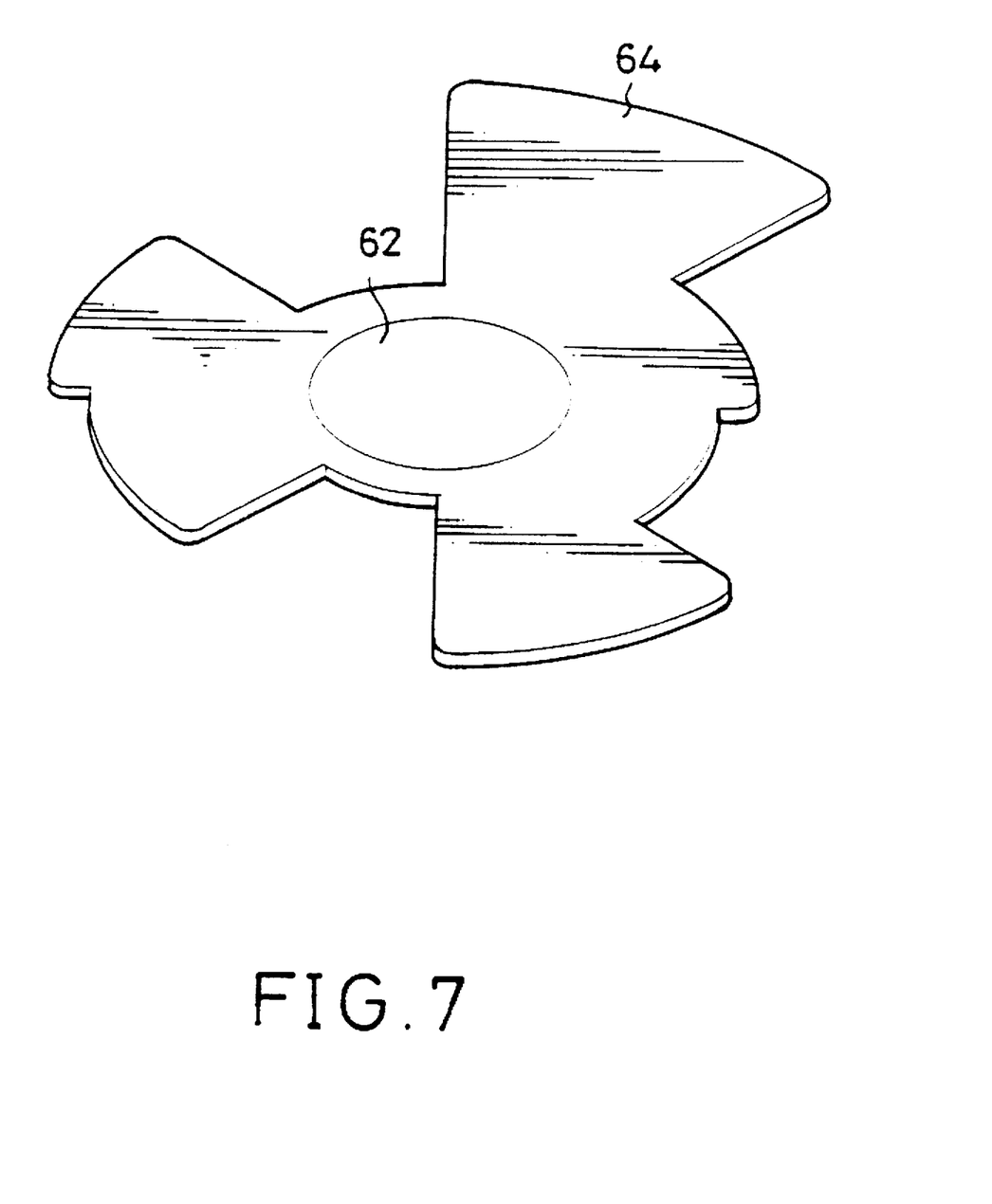
FIG. 7 is a perspective view of the fifth embodiment of the means in accordance with the present invention.
Figure 8:
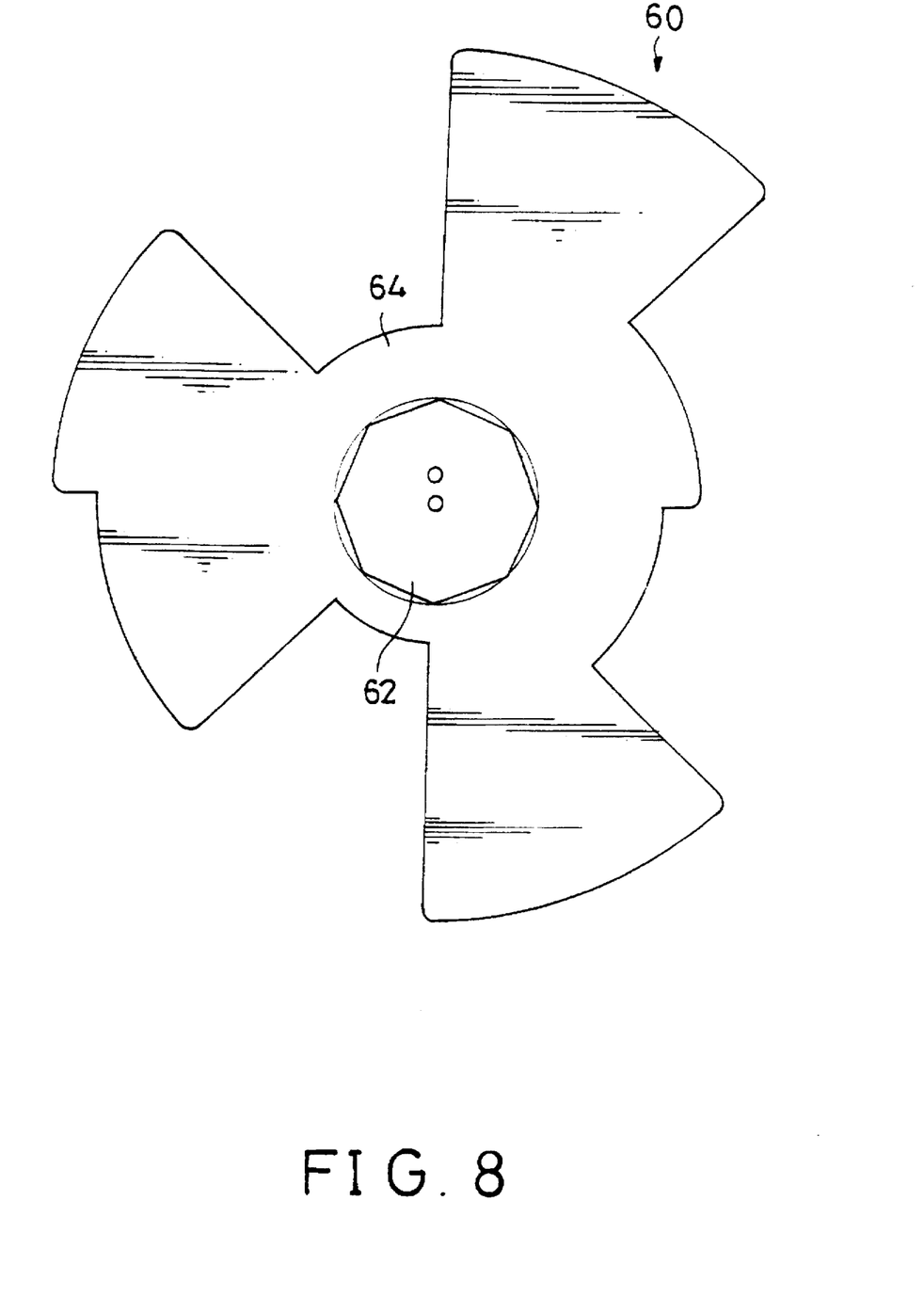
FIG. 8 is a top plan view to show the fifth embodiment of the means in accordance with the present invention.

FIGS. 7 and 8 are a fifth embodiment of the present invention wherein position 5 is a circular plate 62 from which eight plates 64 extend radially, every two adjacent plates 64 having an angle of 45 degrees defined therebetween. According to the description mentioned above, there are four straight axes comprising three positions including and passing through the position 5, weights on both sides of each of the axes are maintained to be balanced when taking moment relative to the axis, that is to say, each of the weights mulbiplied by a number will still maintain the balance. Therefore, the distance from the weight to the axis and the weight can be adjusted under the condition of having the required value. That means the radial length of each of the plates 64 can be adjusted in accordance with the principle discussed above. For example, if every one of plates 64 has the same weight although a shape and size thereof are different, then the distance can be extended according to a product of a number by the numeral designating the position, for example the distance from a weight in position 8 to the axis of positions 4–5–6 could be 2 multiplied by 8, thus, the means shown in FIGS. 7 and 8 is formed.

Figure 9:
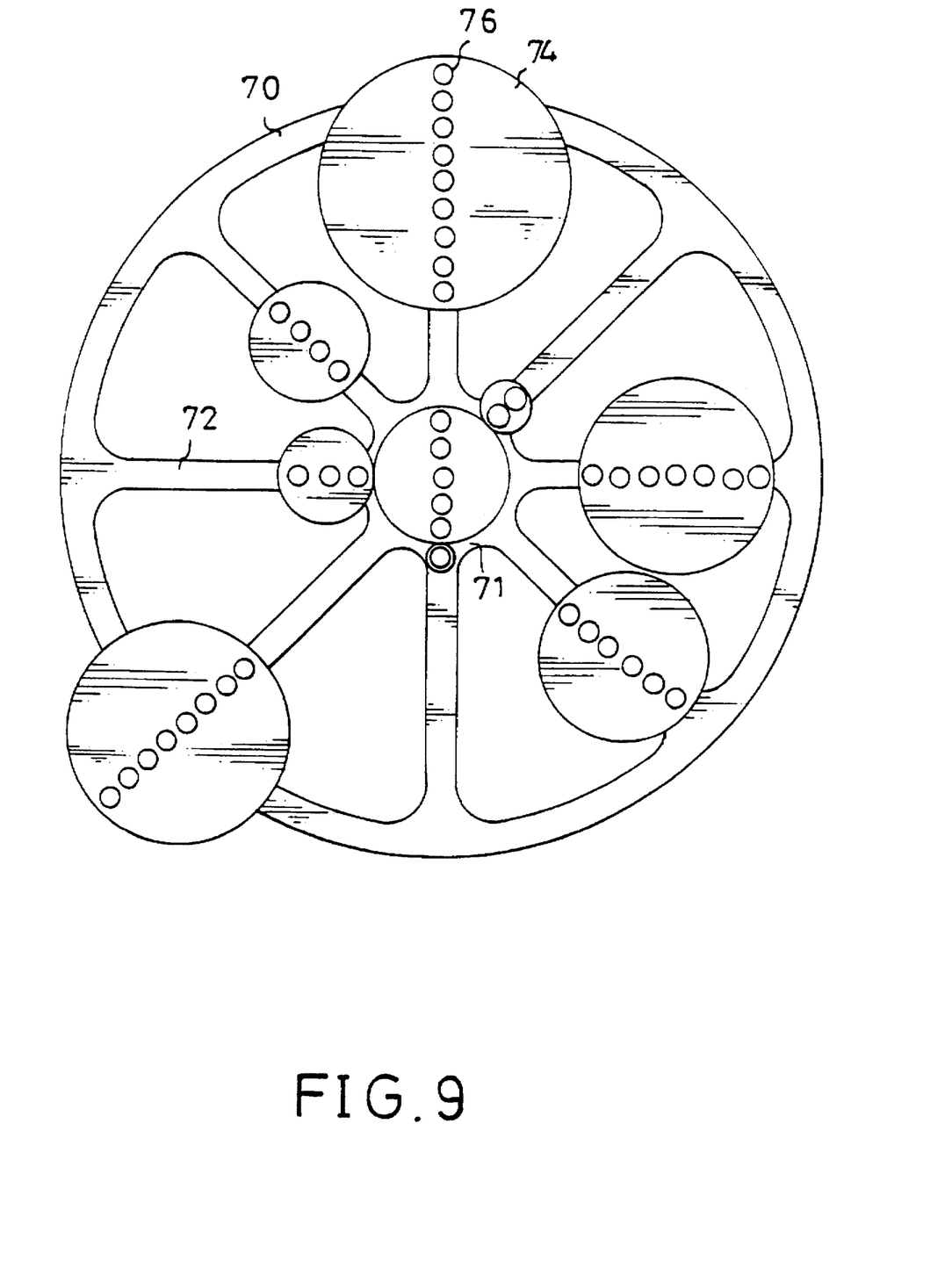
FIG. 9 is a top plan view to show another type of the fifth embodiment of the means in accordance with the present invention.

FIG. 9 shows another type of the embodiment of the fifth embodiment, which is a wheel 70 and has a round board 71 disposed to a center thereof, eight ribs 72 each extending radially from the round board 71, each of the ribs 72 having a disk 74 disposed thereto and located at a distance from the round board 71 according to the result discussed relative to FIGS. 7 and 8. Each of the disks 74 has a recess or recesses 76 defined therein in the order as shown in FIGS. 5 or 6, each of the recesses 76 having a ball (not shown) received therein.

Figure 10:
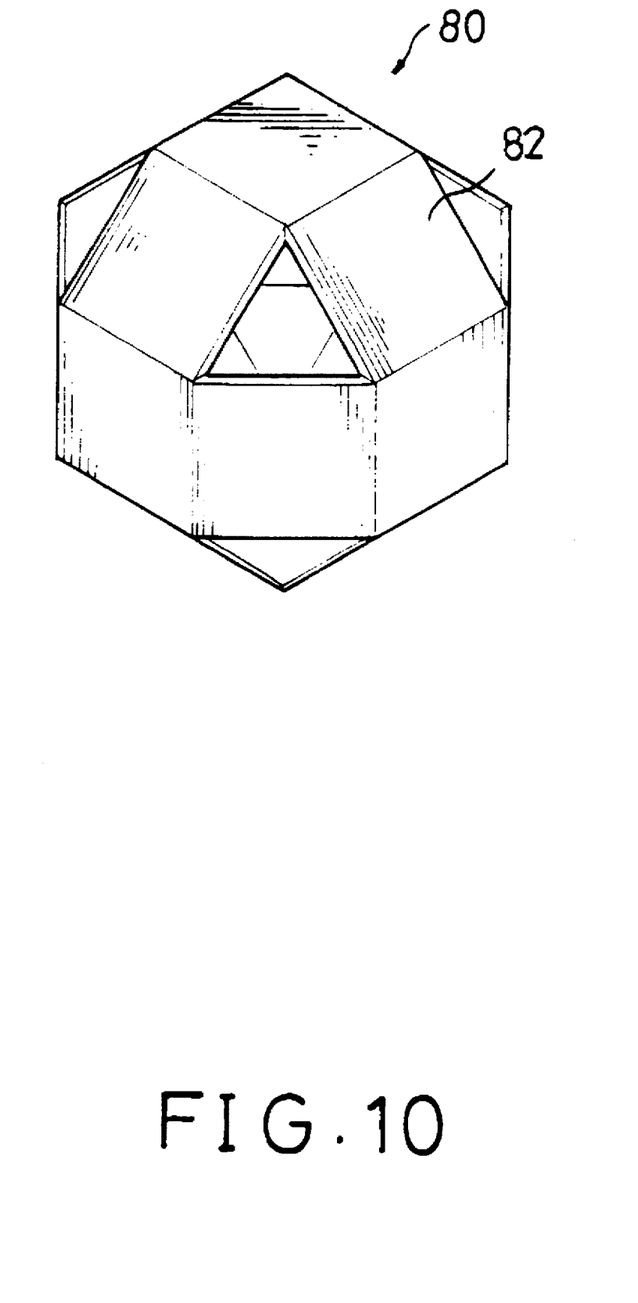
FIG. 10 is a perspective view of a sixth embodiment of the means in accordance with the present invention.
Figure 11:
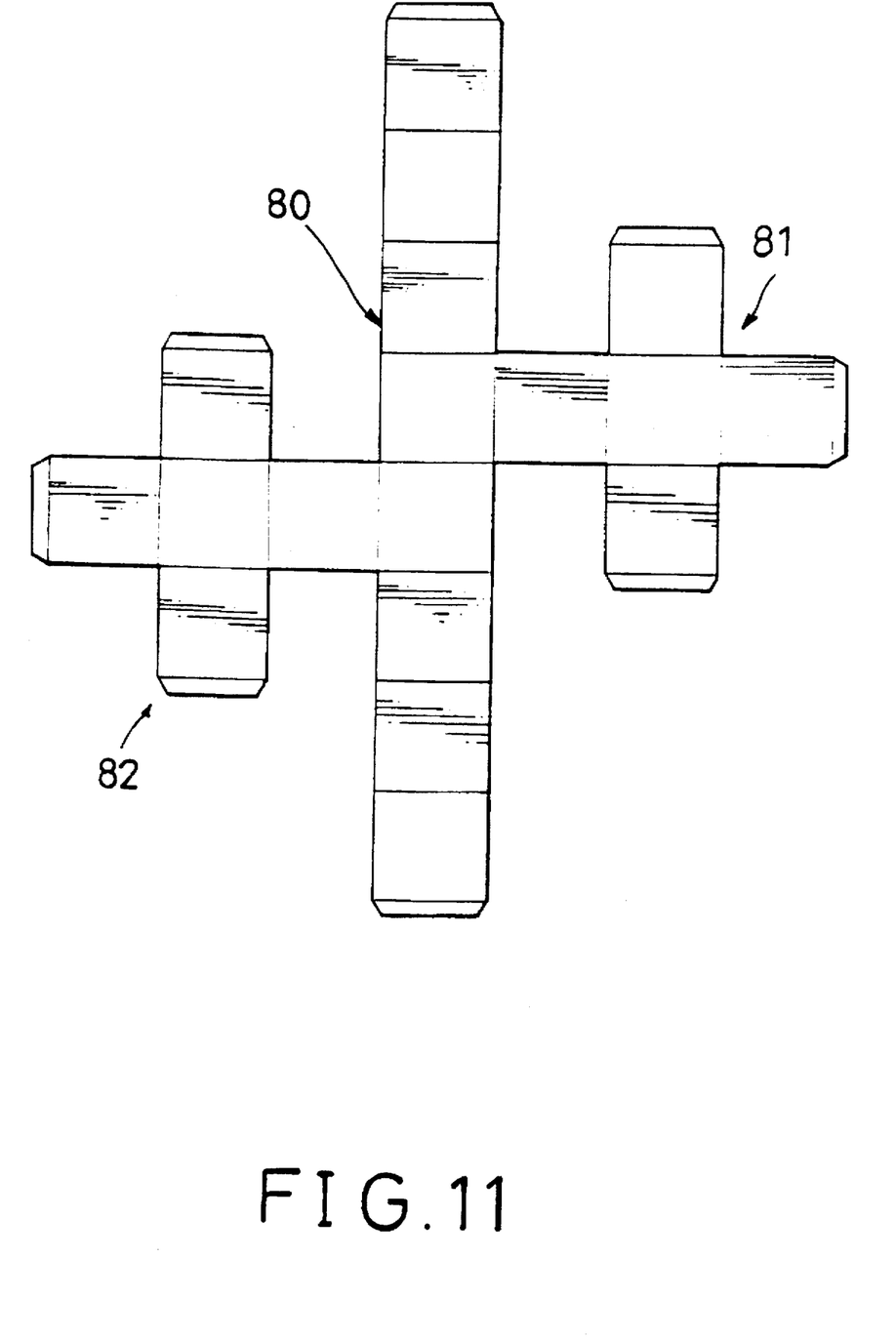
FIG. 11 is an expanded view of the sixth embodiment of the means in accordance with the present invention.
Figure 12:
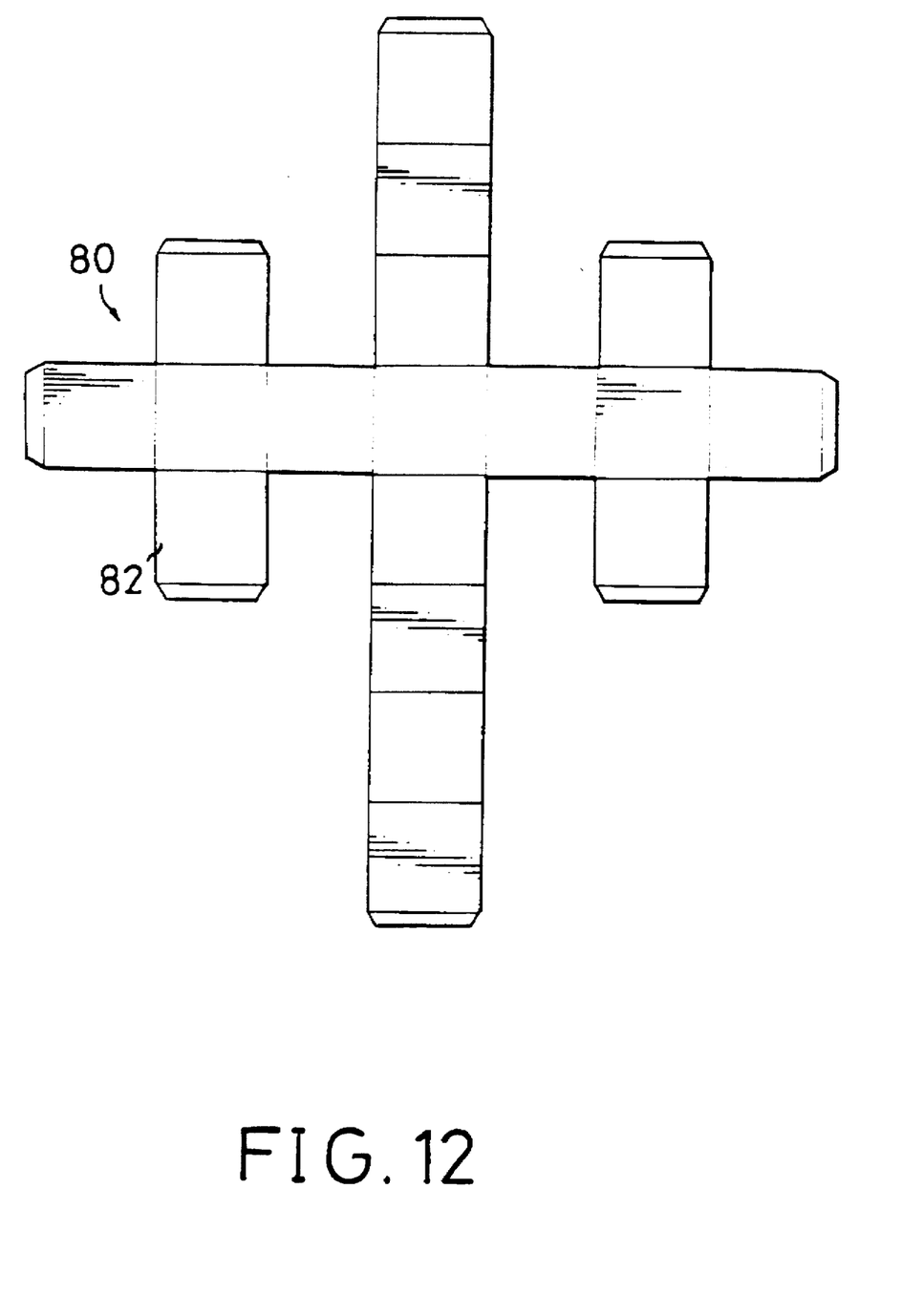
FIG. 12 is an expanded view of another type of the sixth embodiment of the means in accordance with the present invention.
Figure 13:
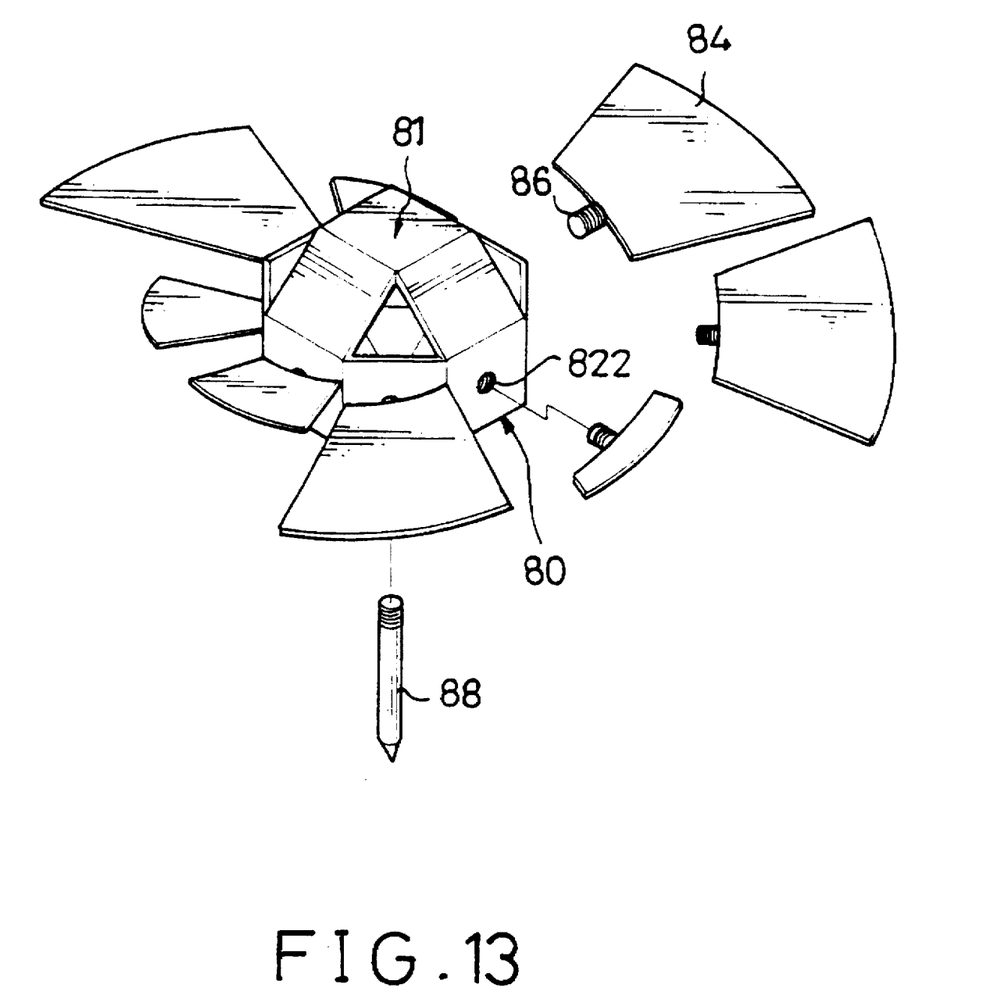
FIG. 13 is an exploded view of yet another embodiment of the sixth embodiment of the means in accordance with the present invention.
Figure 14:
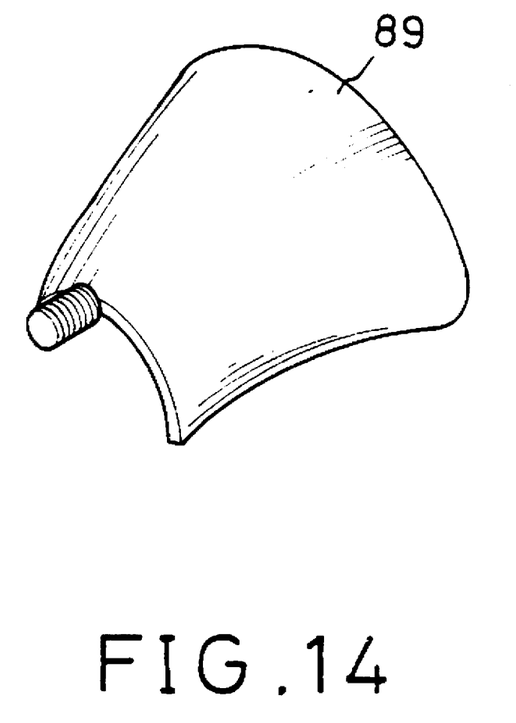
FIG. 14 is a perspective view of a part disposed to the means shown in FIG. 13.

FIGS. 10 and 11 show a sixth embodiment of the present invention and which is composed of a side wall 80 with eight sides, a first five-part member 81 and a second five-part member 82. The first five-part member 81 is configured to be a cross extending laterally from the fourth side of the side wall 80 and the second five-part member 82 is configured to be a cross extending laterally from the fifth side of the side wall 80. The first five-part member 81 is located on a top of an area enclosed by the side wall 80 and the second five-part member 82 is located on a bottom of an area enclosed by the side wall 80. Therefore, each one of eight sides of the side wall 80 can be treated as a position as shown in FIG. 2 and each of the sides has a wing part 84 disposed thereto. Each of the sides has a threaded hole defined therein and each of the wing parts 84 has a threaded rod 86 extending therefrom so as to be threadedly received in the threaded hole 822 corresponding thereto. Each of the wing parts 84 has a length and a weight which both meeting the principle discussed in FIGS. 2 and 7 and a needle 88 disposed to a center of the second five-part member 82 such that the means can be used as a gyratory toy. FIG. 12 shows a similar structure as that shown in FIG. 11 except that the top and the bottom of FIG. 11 are not symmetrical but the top and the bottom of the FIG. 12 are symmetrical. FIG. 14 shows that each of the wing parts 89 can be designed as a curved plate and thus when the wing parts 89 are disposed to the side wall 80 shown in FIGS. 11 and 12, the means can fly when rotated.

Figure 15:
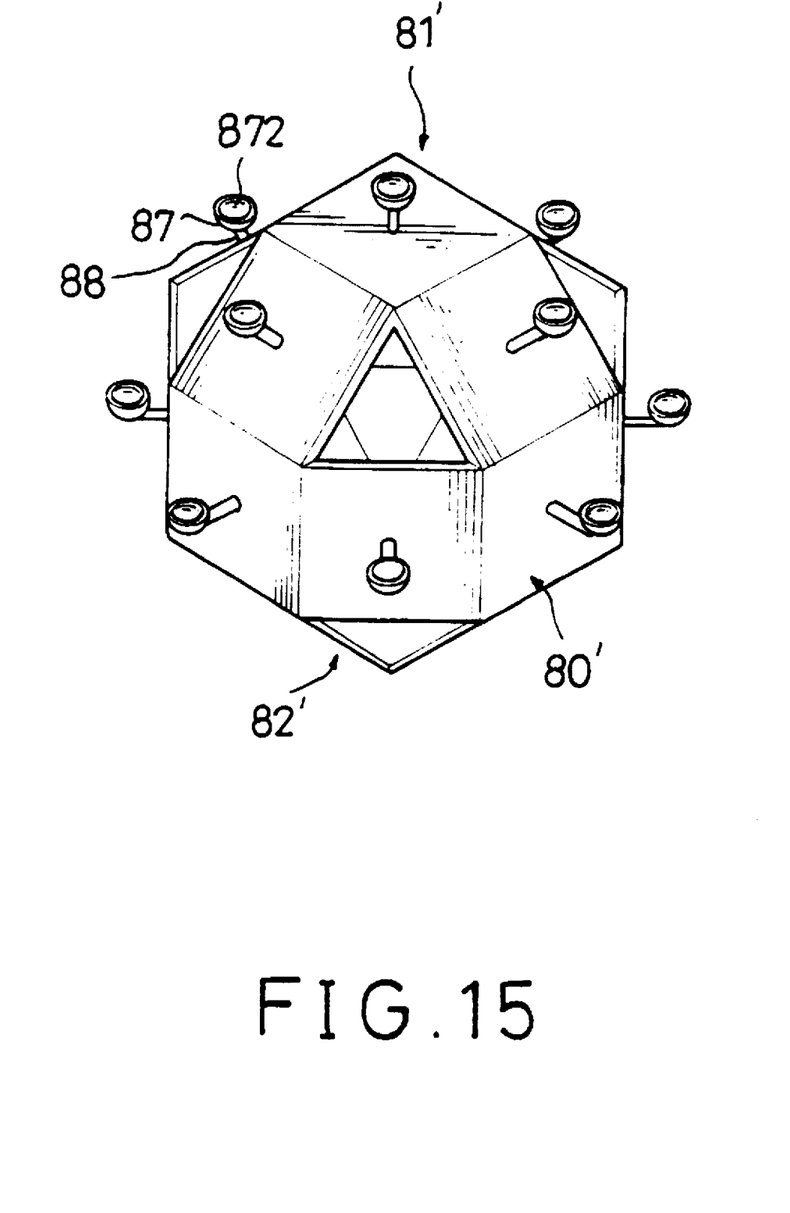
FIG. 15 is a perspective view of another type of the sixth embodiment of the means in accordance with the present invention.

FIG. 15 shows another type of the sixth embodiment of the present invention, a cup means including a rod extending from each side of the side wall 80', each side of the first five-parts member 81' and each side of the second five-parts member 82', and a cup 87 connected to each of the rods 88. Each of the cups 87 has a recess 872 defined therein so as to receive a ball (not shown) therein, that is to say, the wing parts 84/89 are replaced by the cup means and the ball.

Figure 16:
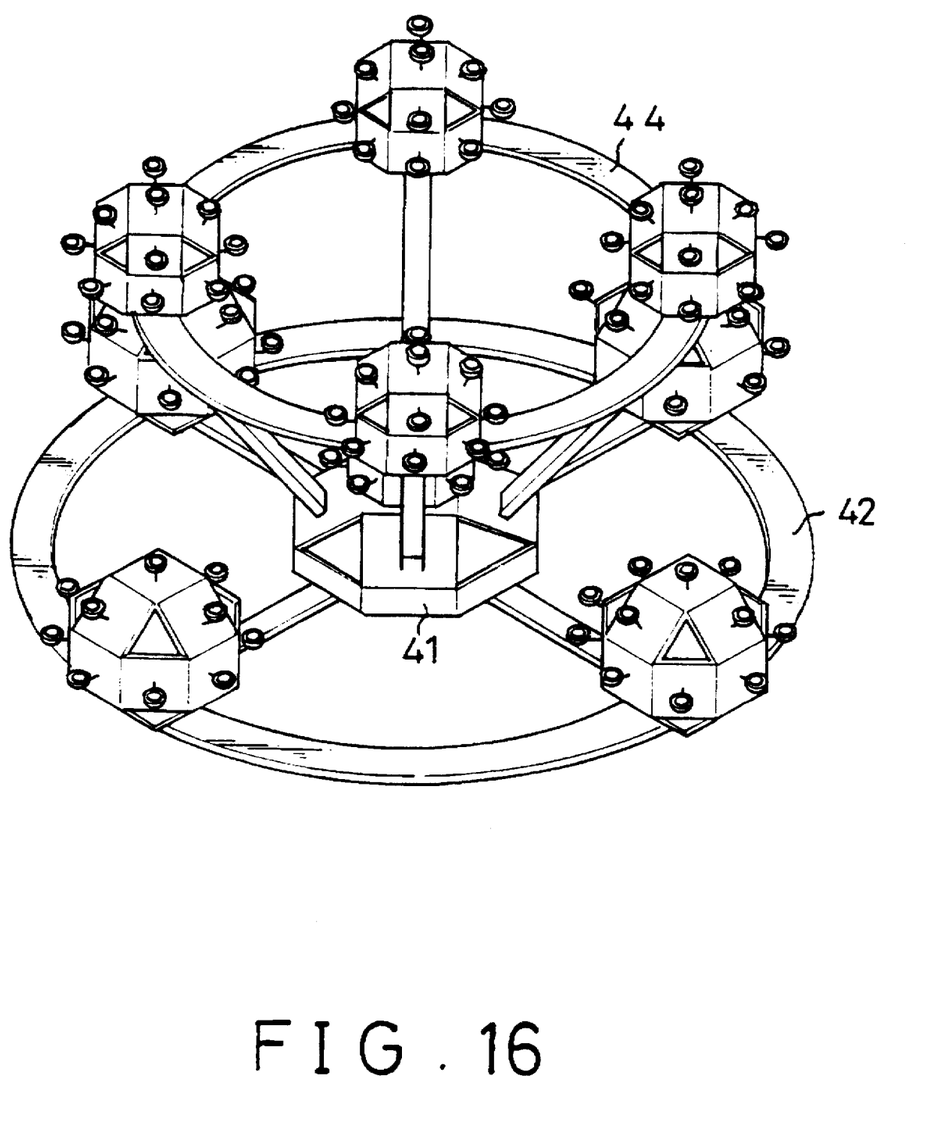
FIG. 16 is a perspective view of a seventh embodiment of the means in accordance with the present invention.

FIG. 16 shows a seventh embodiment of the present invention wherein an assembly as shown in FIG. 15 is utilized to dispose to the structure as shown in FIG. 6, that is to say, the assembly shown in FIG. 15 is disposed to each one of positions of the structure shown in FIG. 6 and the whole structure is still maintained to be balanced.

Although the invention has been explained in relation to its preferred embodiment, it is to be understood that many other possible modifications and variations can be made without departing from the spirit and scope of the invention as hereinafter claimed.

What is claimed is:

1. An asymmetrical balance means comprising nine positions formed thereto, from position 1 to position 9, each of the positions being a center of gravity of a part disposed thereto, said center of gravity having a value the same as the numeral designating said position;

said eight positions, except said position 5, being arranged such that a square is formed by connecting said eight positions with said position 5 located at a center of said square;

said square comprising an upper horizontal side, a lower horizontal side, a right vertical side and a left vertical side, said right vertical side intersecting with said upper horizontal side at said position 2 and intersecting with said lower horizontal side at said position 6, said left vertical side intersecting with said upper horizontal side at said position 4 and intersecting with said lower horizontal side at said position 8, said upper horizontal side having said position 9 located at a middle point thereof and said lower horizontal side having said position 1 located at a middle point thereof, said right vertical side having said position 7 located at a middle point thereof and said left vertical side having said position 3 located at a middle point thereof;

a first loop inscribing said square, said square and said first loop contacting each other at said positions 7, 9, 3 and 1;

a first cross frame disposed within said first loop and an intersection of said first cross frame being coincident with a center of said first loop; and a second loop circumscribing said square.

2. The asymmetrical balance means as claimed in claim 1 wherein said means comprises a third loop inscribing said square and having four positions disposed thereto, said four positions being position 7, position 9, position 3 and position 1;

a fourth loop having a projection circumscribing said square and disposed below said third loop with at least two links connected between said third loop and said fourth loop, and a second cross frame disposed within said fourth loop and an intersection of said second cross frame being coincident with a center of said fourth loop.

3. An asymmetrical balance means comprises nine positions formed thereto, from position 1 to position 9, each of said positions being a center of gravity of a part disposed thereto, said center of gravity having a value which is a multiple of the numeral designating said position;

said eight positions, except said position 5, being arranged such that a square is formed by connecting said eight positions with said position 5 located at a center of said square;

said square comprising an upper horizontal side, a lower horizontal side, a right vertical side and a left vertical side, said right vertical side intersecting with said upper horizontal side at said position 2 and intersecting with said lower horizontal side at said position 6, said left vertical side intersecting with said upper horizontal side at said position 4 and intersecting with said lower horizontal side at said position 8, said upper horizontal side having said position 9 located at a middle point thereof and said lower horizontal side having said position 1 located at a middle point thereof, said right vertical side having said position 7 located at a middle point thereof and said left vertical side having said position 3 located at a middle point thereof;

a first loop inscribing said square, said square and said first loop contacting each other at said positions 7, 9, 3 and 1;

a first cross frame disposed within said first loop and an intersection of said first cross frame being coincident with a center of said first loop; and a second loop circumscribing said square.

4. The asymmetrical balance means as claimed in claim 3 wherein said means comprises a third loop inscribing said square and having four positions disposed thereto, said four positions being position 7, position 9, position 3 and position 1;

a fourth loop having a projection circumscribing said square and disposed below said third loop with at least two links connected between said third loop and said fourth loop, and a second cross frame disposed within said fourth loop and an intersection of said second cross frame being coincident with a center of said fourth loop.

* * * * *